(12) United States Patent
Baumoel

(10) Patent No.: US 9,494,454 B2
(45) Date of Patent: Nov. 15, 2016

(54) PHASE CONTROLLED VARIABLE ANGLE ULTRASONIC FLOW METER

(71) Applicant: Joseph Baumoel, Wellington, FL (US)

(72) Inventor: Joseph Baumoel, Wellington, FL (US)

( * ) Notice: Subject to any disclaimer, the term of this patent is extended or adjusted under 35 U.S.C. 154(b) by 0 days.

(21) Appl. No.: 14/255,408

(22) Filed: Apr. 17, 2014

(65) Prior Publication Data

US 2015/0160053 A1    Jun. 11, 2015

Related U.S. Application Data

(60) Provisional application No. 61/912,671, filed on Dec. 6, 2013.

(51) Int. Cl.
| | | |
|---|---|---|
| *G01F 1/66* | (2006.01) | |
| *B06B 1/02* | (2006.01) | |
| *B06B 1/06* | (2006.01) | |
| *G10K 11/34* | (2006.01) | |

(52) U.S. Cl.
CPC ............. *G01F 1/667* (2013.01); *B06B 1/0215* (2013.01); *B06B 1/0607* (2013.01); *G01F 1/662* (2013.01); *G10K 11/346* (2013.01)

(58) Field of Classification Search
CPC ...................................................... G01F 1/667
USPC .......... 73/641, 628; 310/354, 355, 340, 348, 310/334, 336, 337
See application file for complete search history.

(56) References Cited

U.S. PATENT DOCUMENTS

| | | | |
|---|---|---|---|
| 2,746,291 A | 5/1956 | Swengel | |
| 3,817,098 A | 6/1974 | Brown | |
| 4,070,905 A * | 1/1978 | Kossoff | 73/641 |
| 4,144,752 A | 3/1979 | Lolk | |
| 4,170,142 A * | 10/1979 | Posakony et al. | 73/603 |
| 4,235,112 A * | 11/1980 | Kaiser | G01N 29/223 367/96 |
| 4,297,607 A | 10/1981 | Lynnworth et al. | |
| 4,480,486 A | 11/1984 | Meisser et al. | |
| 4,537,073 A * | 8/1985 | Ooshiro et al. | 73/602 |
| 4,670,683 A * | 6/1987 | 't Hoen | 310/334 |
| 4,693,319 A * | 9/1987 | Amemiya | 600/438 |
| 5,052,230 A | 10/1991 | Lang et al. | |
| 5,060,651 A * | 10/1991 | Kondo et al. | 600/443 |
| 5,105,666 A | 4/1992 | Steinacher | |
| 5,161,413 A * | 11/1992 | Junker | G01N 29/223 73/634 |

(Continued)

FOREIGN PATENT DOCUMENTS

WO    WO 2012129101 A1 *  9/2012 ............. G01F 1/667

OTHER PUBLICATIONS

International Search Report dated Apr. 15, 2015 corresponding to PCT/US2014/069046.

*Primary Examiner* — Laura Martin
*Assistant Examiner* — Rose M Miller
(74) *Attorney, Agent, or Firm* — F. Chau & Associates, LLC

(57) ABSTRACT

An ultrasonic transducer includes: a plurality of segment electrodes located on a surface of a single piezoelectric element; a pulse generator configured to generate a pulse signal having pulses of a certain frequency; and a control circuit that sequentially activates the segment electrodes using the pulse signal to cause the element to emit a sonic signal, where a controlled delay time between activation of each segment electrode varies the emission angle of the sonic signal so as to compensate for angle changes caused by either changes in Beam refraction or due to Beam Blowing caused by high flow velocity.

20 Claims, 12 Drawing Sheets

(56) References Cited

U.S. PATENT DOCUMENTS

| | | | |
|---|---|---|---|
| 5,228,347 A * | 7/1993 | Lowell et al. | 73/861.28 |
| 5,433,117 A | 7/1995 | Taphorn et al. | |
| 5,437,194 A * | 8/1995 | Lynnworth | 73/861.27 |
| 5,597,962 A | 1/1997 | Hastings et al. | |
| 5,627,323 A | 5/1997 | Stern | |
| 5,811,689 A | 9/1998 | Collier et al. | |
| 6,026,693 A | 2/2000 | Baumoel et al. | |
| 6,055,868 A | 5/2000 | Koyano et al. | |
| 6,118,205 A * | 9/2000 | Wood | G06F 3/03545 310/316.01 |
| 6,338,277 B1 | 1/2002 | Diston et al. | |
| 7,448,282 B2 | 11/2008 | Wiest et al. | |
| 7,911,306 B2 | 3/2011 | Allen | |
| 8,356,522 B2 | 1/2013 | Allen | |
| 8,505,391 B1 | 8/2013 | Baumoel | |
| 8,770,028 B2 * | 7/2014 | Kleinert | G01N 29/0645 73/634 |
| 2002/0073781 A1 * | 6/2002 | Hashimoto et al. | 73/641 |
| 2003/0051559 A1 | 3/2003 | Ehrlich et al. | |
| 2003/0055337 A1 | 3/2003 | Lin | |
| 2004/0070100 A1 | 4/2004 | Strobel et al. | |
| 2007/0034016 A1 | 2/2007 | Maginnis et al. | |
| 2007/0186681 A1 | 8/2007 | Shkarlet et al. | |
| 2008/0236297 A1 | 10/2008 | Fleet et al. | |
| 2009/0016555 A1 | 1/2009 | Lynnworth | |
| 2009/0019945 A1 | 1/2009 | Matsushita | |
| 2010/0151173 A1 | 6/2010 | Peduto | |
| 2010/0192702 A1 | 8/2010 | Satou et al. | |
| 2012/0144930 A1 | 6/2012 | Aughton et al. | |
| 2013/0080081 A1 * | 3/2013 | Dugger | G01F 1/667 702/48 |

\* cited by examiner

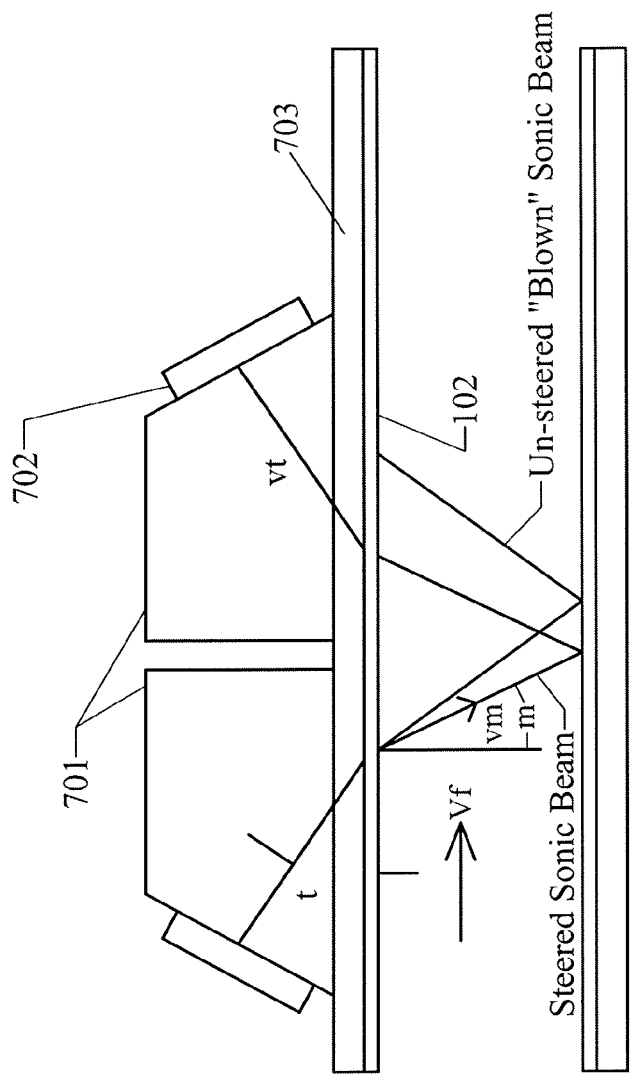
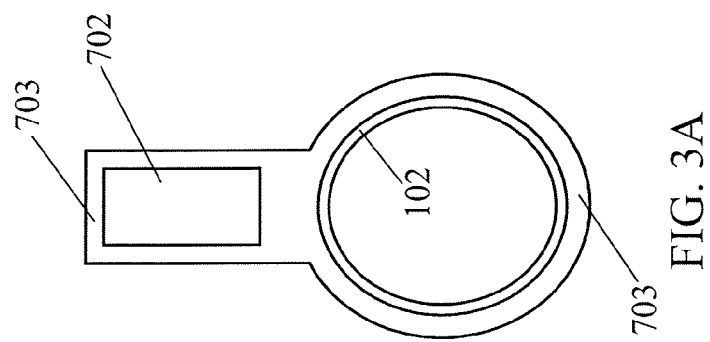
FIG. 3B
FIG. 3A

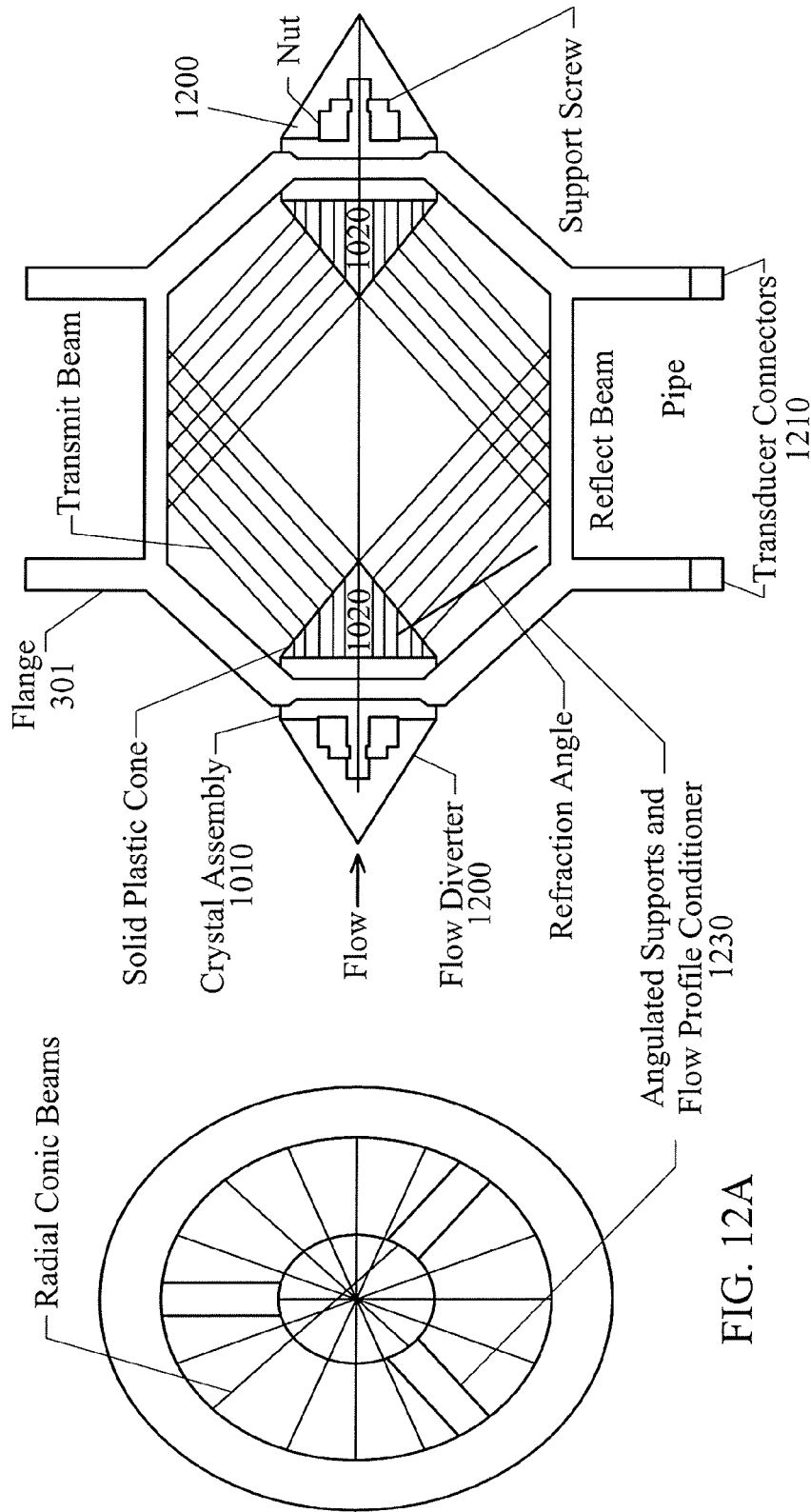

PHASE CONTROLLED VARIABLE ANGLE ULTRASONIC FLOW METER

CROSS-REFERENCE TO RELATED APPLICATIONS

This application claims priority to U.S. Provisional Application No. 61/912,671, filed on Dec. 6, 2013, the disclosure of which is incorporated by reference herein.

TECHNICAL FIELD

The present disclosure relates to ultra sonic flow meters, and more particularly to adjustable ultrasonic flow meters.

DISCUSSION OF RELATED ART

Various liquids and gases are distributed by suppliers to consumers in both commercial and residential applications, requiring the measurement of these substances to determine the payment to be made by the consumer to the supplier. Of consummate importance is that the measurement accuracy be accepted by both the supplier and consumer.

Typical of such a situation is the supply of natural gas, oil or water from a utility to a residential or commercial customer. A conventional method of measurement of Natural Gas is via a mechanical device through which the supplied gas flows, and in which rotates gears which drive numerical displays which indicate the amount of product which has been delivered. Such mechanical devices are subject to a wide variety of changes in calibration due to wear and changes in temperature, pressure and humidity. Other mechanical devices, such as turbines, orifice plates and pressure sensors can perform the same function, but are also subject to calibration variation due to similar causes. In particular, the operation of all mechanical devices is subject to friction effects, which can vary over time and affect measurement accuracy.

Unlike mechanical flow meters, Transit Time Ultrasonic flow meters have no moving parts and therefore friction is not a factor in their operation. Accordingly, Ultrasonic flow meters, of both the Clamp-On and Wetted types, have been used quite successfully in commercial applications. However, they are subject to other sources of calibration change.

SUMMARY OF THE INVENTION

An ultrasonic transducer according to an exemplary embodiment of the invention includes a piezoelectric element divided into a plurality of segments, a pulse generator configured to generate a pulse signal that comprises pulses of a transmit frequency; and a control circuit that sequentially activates the segments using the pulse signal to cause the piezoelectric element to emit a sonic signal, where a delay time between activation of each successive segment controls phase velocity of the sonic signal, and the angle of emission of the sonic signal.

A wetted ultrasonic flow meter according to an exemplary embodiment of the invention includes a spool of pipe; a transmit ultrasonic transducer mounted within the pipe through a first opening in an inner wall of the pipe to emit a transmit pulse; and a receive ultrasonic transducer mounted within the pipe through a second opening in the inner wall to receive the transmit pulse, where the pipe wall includes a plurality of V-shaped cuts, and a sonically dissipative material fills the cuts.

A clamp-on ultrasonic flow meter according to an exemplary embodiment of the invention includes a housing comprising: a transmit ultrasonic transducer; a receive ultrasonic transducer; and a circuit board, where each transducer comprises a piezoelectric element divided into a plurality of segments. The circuit board comprises: a pulse generator configured to generate a pulse signal that comprises pulses of a transmit frequency; and a control circuit that sequentially activates the segments using the pulse signal to cause the piezoelectric element to emit a sonic signal, where a delay time between activation of each successive segment controls phase velocity of the sonic signal, and an angle of emission of the sonic signal into a medium.

An ultrasonic transducer according to an exemplary embodiment of the invention includes a first piezoelectric element; a first support housing that holds the first piezoelectric element; and a first cone mounted to the housing, wherein a base of the first cone opposite its apex is mounted to the first housing. In an embodiment, the first piezoelectric element has a circular shape, and includes concentric ring shaped segments, and the first cone is solid plastic.

BRIEF DESCRIPTION OF THE DRAWINGS

Exemplary embodiments of the invention can be understood in more detail from the following descriptions taken in conjunction with the accompanying drawings in which:

FIG. 3A and FIG. 3B illustrate a clamp-on ultrasonic flow meter according to an exemplary embodiment of the invention.

FIG. 12A and FIG. 12B illustrate a flange mounted ultrasonic flow meter according to an exemplary embodiment of the invention.

DETAILED DESCRIPTION

Exemplary embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

At least one embodiment of the invention is based on use of phase control, as will be described below, to control the angle of emission of an ultrasonic beam relative to the plane of the surface of an emitter of ultrasonic energy within an ultrasonic flow meter. The plane may be formed by an object into which such ultrasonic energy is introduced. For example, if the emitter is a piezoelectric element such as a piezoelectric crystal, the plane is the surface of the crystal. The piezoelectric element may also be a piezoelectric ceramic. Thus, whenever a crystal or a piezoelectric crystal is described herein, it may be replaced with another piezoelectric element such as a piezoelectric ceramic. In an exemplary embodiment, the sonic energy in the emitting surface travels in a direction parallel to and coincident with the surface of the plane.

A Clamp-on ultrasonic flow meter of the Wide Beam Principle, in which the transducer injects a sonic beam at such an angle that the phase velocity of the injected beam matches the shear mode propagation velocity of the pipe material, produces very high flow measurement accuracy. In such a device, the clamp-on nature of the transducer enables the installer to place the transducers on the pipe in such a way as to account for the angle of the sonic beam in the flowing medium, which is determined by the sonic propagation of the medium itself, Vm.

Another manifestation of ultrasonic flow metering is accomplished by installing a transducer which emits sonic energy normal to its surface at a fixed angle to the axis of the pipe. In such a device, this angle is independent of Vm, but the effective angle could still be affected if the flow velocity, Vf, is a high proportion of Vm.

Embodiments of the invention described herein allow placement of Clamp-On or a Wetted ultrasonic transducers to permit a sonic beam to be directed at such an angle that the sonic beam arrives exactly on target to a receive transducer at all times and regardless of what the sonic propagation velocity of the medium happens to be, even if variable, regardless of the flow velocity, Vf, and regardless of its proportion of Vm.

Figure 1:
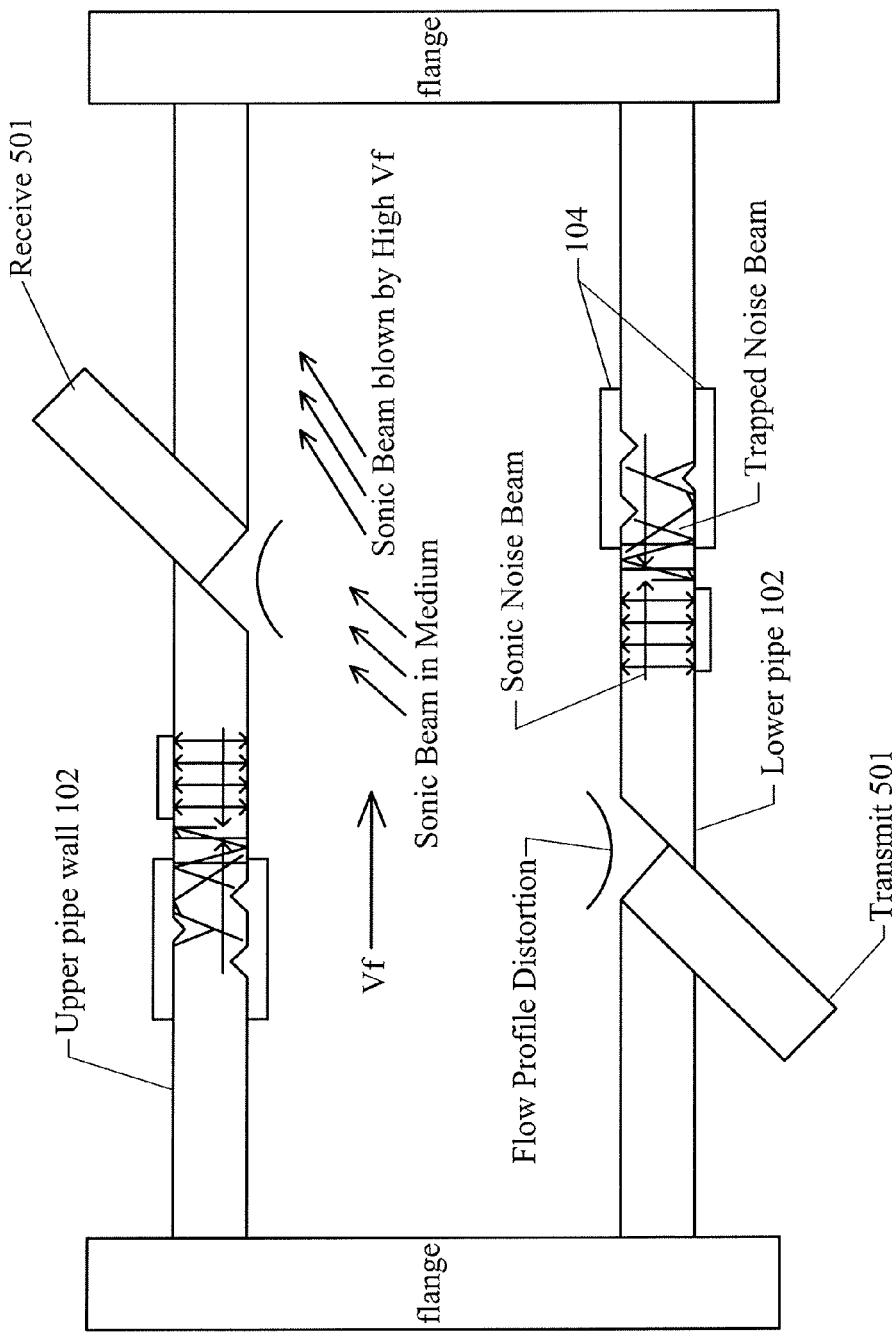
FIG. 1 illustrates use of a sonic trap with wetted ultrasonic transducers according to an exemplary embodiment of the invention.

FIG. 1 illustrates a wetted ultrasonic flow meter (WUTF) according to an exemplary embodiment of the invention. The flow meter includes a pair of wetted transducers 501 (e.g., transmit and receive). Each transducer is mounted at some angle relative to the axis of the pipe 102, and emits sonic energy normal to its surface. In such a device, this angle is independent of Vm, but the effective angle could still be affected by beam blowing if the flow velocity Vf is a high proportion of Vm.

The pair of transducers 501 acts alternately as transmitters or receivers of sonic pulses, which are directed at an angle determined by the construction of the flow tube. This angle determines the nominal calibration. While this angle does not change, it is possible for the sonic beam to be "blown" by the flow of the medium in a downstream application. This can change the impact of the beam with the receive transducer, which affects the shape of the received signal and therefore has a second order effect on calibration. Further, in the case of gas flow, the flow velocity approaches the order of magnitude of the velocity of the sonic beam itself, and can actually "blow" the beam entirely away from the receive transducer, as shown in FIG. 1, causing failure to operate. A second factor, which can affect the accuracy of the WTUF is the distortion of flow profile caused by the cavities created where the transducers enter the interior of the pipe. This distortion varies with medium flow rate and with viscosity, but can be corrected with direct calibration.

Referring to FIG. 1, the first illustrated ultrasonic transducer 501 can be referred to as an upstream transmit ultrasonic transducer and the second illustrated ultrasonic transducer 501 can be referred to as a downstream ultrasonic transducer, and when the upstream ultrasonic transducer is activated it transmits a sonic beam/pulse downstream to the downstream ultrasonic transducer, and when the downstream ultrasonic transducer is activated it transmits a sonic beam/pulse upstream to the upstream ultrasonic transducer, and the difference of measured travel time between the upstream and downstream sonic pulses is proportional to the flow rate of the medium (e.g., water, oil, gas, etc) within the pipe 102.

The transmission signal enters the medium through the pipe wall 102, and can be transmitted by this path to the receive transducer where it can interfere with or even obscure the signal that arrives via the medium. This can also happen in a wetted transducer, since its body has to be secured to the pipe 102. In either case, an exemplary embodiment of the invention installs a sonic trap on the pipe wall, preferably between transmitter and receiver transducers if possible. This trap can be installed on any section of pipe, as shown in FIG. 1.

In an exemplary embodiment, the sonic trap 104 consists of a series of approximately 1 wavelength sizes cuts into the interior or exterior wall of the pipe. Each cut may be V shaped. In an exemplary embodiment, all the V-shaped cuts are a same size. In an exemplary embodiment, the cuts are on the outside of the pipe wall 102, or the inside of the pipe wall 102, or the cuts are located on both the outside and the inside of the pipe wall 102. In an exemplary embodiment, the cuts are located on both the outside and the inside of the pipe wall, and the cuts located on the inside do not overlap with the cuts located on the outside. A sonic trap 104 (e.g., sonically dissipative compound such as plastic) is used to fill in the wells created by the cuts.

A wavelength refers to the distance that sound will travel in any medium over the amount of time that it takes for one cycle of the propagating frequency to be completed. If the frequency of a crystal within transducer 501 is 1 megahertz, and sound travels within the transducer at 60,000 inches per second, then sound travels 60,000/1,000,000=0.06 inches in 1 microsecond=1 wavelength. Thus, in this example, the size of the cuts would be 0.06 inches.

By facing the cuts at opposite angles, the sound passing between them is reflected back and forth. Filling the slots and even the un-slotted regions on the inside and outside walls of the pipe allows the sound energy to be absorbed and dissipated before it fully escapes this trap, resulting in a profoundly improved Signal to Noise ratio at the receive transducer.

The sonic trap 104 works by reflecting the sonic energy into a space filled with a sonically dissipative compound (e.g., plastic). The reflection of the metal is due to its much higher sonic impedance than the plastic, reflecting the energy back into to the plastic. The multiple reflections caused by the trapping serve to gradually reduce that energy that escapes from the trap, attenuating the sonic signal that could travel from the upstream (transmitter) transducer to the downstream (receiver) transducer through the pipe wall. The trap in the pipe wall 102 serves to repeatedly send the signal into the plastic coating on the inside and optionally also on the outside wall of the pipe 102.

Figure 2:
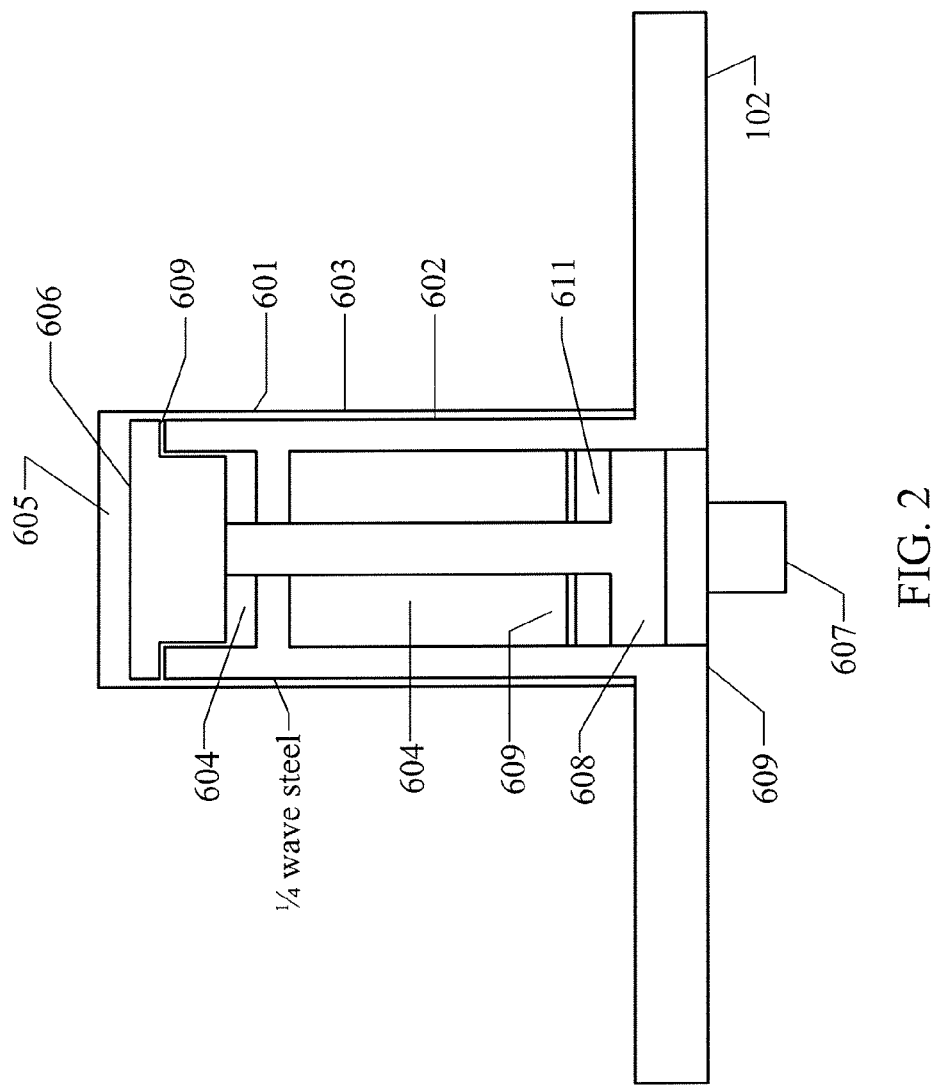
FIG. 2 illustrates a wetted ultrasonic transducer according to an exemplary embodiment of the invention.

FIG. 2 illustrates a wetted ultrasonic transducer (WTUF) according to an exemplary embodiment of the invention. For example, each of the transmit and receive transducers 501 depicted in FIG. 1 may be replaced with the WTUF of FIG. 2. The wetted ultrasonic transducer of FIG. 2 includes single or dual ultrasonic crystals (e.g., piezoelectric) 601 sealed within a metallic (e.g., titanium) tube 602 with a thin front face (e.g., 605) through which the sonic beam emerges, normally orthogonal with that face. For example, the front face of the tube 602 may be a ¼ wavelength plastic coating such as TEFLON, to increase the injection of sonic energy into the medium, by impedance matching.

The crystal(s) 601 may be hermetically sealed with a thin metallic (e.g., titanium) film 606 closing the front face of the transducer, which serves to protect the crystal(s) 601 from the medium itself. The width of the film 604 as an example may be a ¼ wavelength. The structure shown in FIG. 2 also defines the surface angle of the crystal(s) 601 relative to the radius of the pipe (e.g., 90 degrees).

The tube 602 may be coated with a thin damping film 603 to attenuate sonic noise which may otherwise travel through the pipe wall to receive the receive transducer and cause interference with the medium borne flow signal. An example of the damping film 603 is a sound absorptive plastic. The interior of the transducer of FIG. 2 may be filled with a damper 604, which also serves to support the crystal(s) 601. The damper 604 may be a sound absorptive plastic. If the crystals 601 are segmented and driven with a sequential phase displacement as will be described in more detail below, the sonic beam will emerge from the face of the transducer at an angle different from orthogonal, and controlled to counteract the effect of the beam blowing shown in FIG. 1.

As an example, the transducer of FIG. 2 may be secured to the pipe wall 102. The transducer of FIG. 2 may be secured additionally using weld(s) 609, an external thread nut 611, washer(s) 609, etc. The transducer of FIG. 2 may also include a wiring cavity 608 for receiving one or more activation wires and a connector 607. For example, a microprocessor (e.g., 906) can apply a signal to the connector 607 to activate the transducer as a transmit transducer to emit sonic energy, or read the transducer as a receive transducer when it is activated by sonic energy transmitted from a transmit transducer.

FIG. 3A and FIG. 3B illustrate a clamp-on ultrasonic flow meter (COUF) according to an exemplary embodiment of the invention. The flow meter includes a pair of clamp-on transducers 701 (e.g., transmit and receive). Each clamp-on transducer includes a crystal 702.

In an exemplary embodiment, the crystals 601 and 702 are segmented piezoelectric crystals, whose segments are activated sequentially within a certain period with a delay to steer the angle of the sonic beam, which will be discussed in more detail below.

FIG. 3A and FIG. 3B show a steered sonic beam generated as a result of activating the segments sequentially with the correct timing, and un-steered sonic beam that could have been generated if the segments were not activated with the correct timing. The outside of the pipe 102 may be coated with a damper 703, which may be a sonically conductive and dissipative plastic. Further, each crystal 702 may be disposed within a damper 703. FIG. 3A shows a cross section of the pipe 102 where one of the transducers 701 is clamped onto the outside of the pipe 102, and FIG. 3B shows a length of the pipe 102, to which two transducers 701 are clamped onto.

Similar to the WTUF of FIG. 2, the calibration of the COUF of FIG. 3A and FIG. 3B is based on the angle of the sonic beam. However, unlike the WTUF of FIG. 2, the angle is not fixed, but determined by the refraction angle of the sonic beam, which is dependent on the sonic propagation velocity of the medium Vm and Snell's law. Since Vm can change with temperature, pressure, or chemistry, it is necessary for the computation of flow to be corrected for any change in angle. As in the WTUF, the sonic beam angle of the COUF is also affected by beam blowing, which could affect accuracy and ultimately terminate operation of the meter itself. However, as shown in FIG. 3A and FIG. 3B, the clamp-on ultrasonic flow meter does not create cavities on the interior of the pipe 102, and therefore the COUF does not contribute to flow profile error.

In an exemplary embodiment of the invention, the COUF of FIG. 3A and FIG. 3B is operated so that the sonic beams they emit are output at a fixed angle, totally independent of the flow rate or the medium's (e.g., the fluid that flows through pipe 102) sonic propagation velocity. To overcome beam blowing the initial angle of upstream transmission must be directed at a greater upstream angle just sufficient to allow the medium's flow rate to blow the beam downstream by the amount needed for it to counteract the downstream diversion caused by flow rate. Similarly, the downstream transducer also needs to direct the sonic beam upstream of its receive transducer such that the flow will blow the beam downstream so as to arrive directly on the receive transducer. Furthermore, the angles of these beams need to be automatically varied as required, regardless of the magnitude or direction of the flow rate. To overcome the effects of a variation of sonic propagation velocity, an exemplary embodiment of the invention adjusts the sonic transmission angles, via phase control of its segmented transducer, so that the beam is restored to its initial calibration angle, at which the sonic beam falls directly onto the receive transducer.

Figure 4:
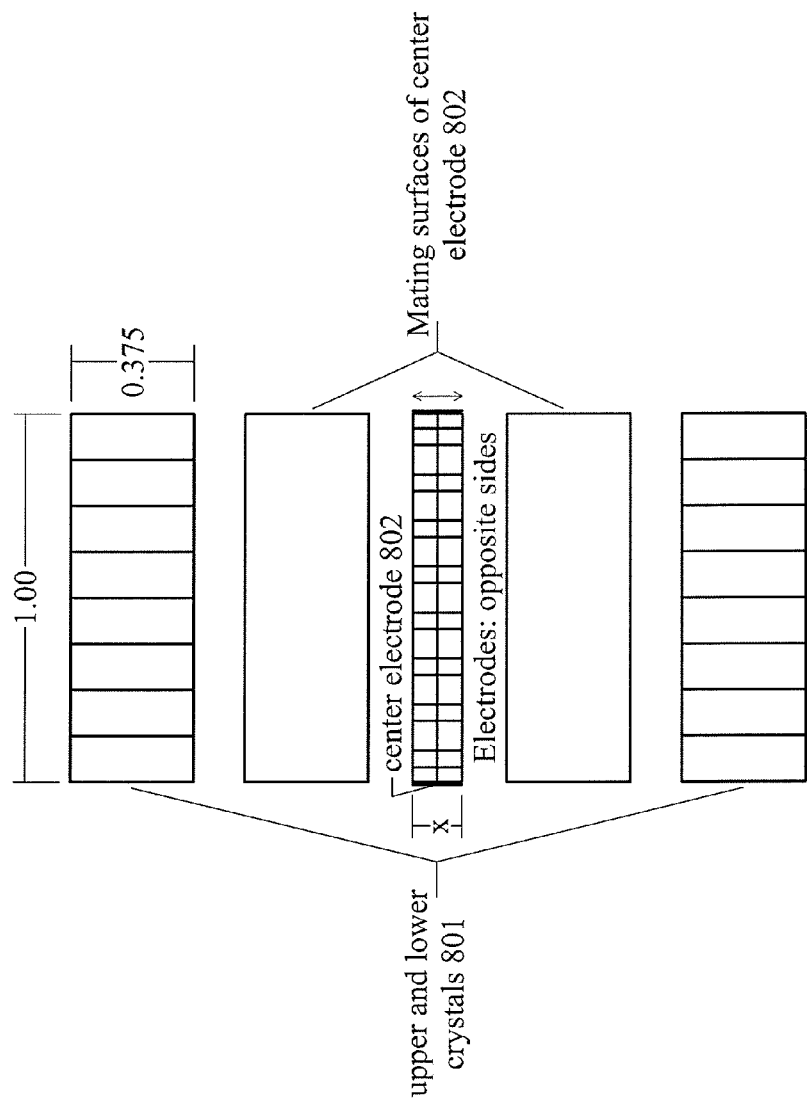
FIG. 4 illustrates an embodiment of a segmented piezoelectric crystal that may be used in embodiments of the transducer.

FIG. 4 illustrates an exemplary embodiment of the crystal 601 of FIG. 2 and the crystal 701 of FIG. 3A and FIG. 3B according to an exemplary embodiment of the invention, which allows them to be operated so that the sonic beams they emit are output at a fixed angles, totally independent of the flow rate or the medium's (e.g., the fluid that flows through pipe 102) sonic propagation velocity.

As discussed above, the crystal may be a piezoelectric crystal. A piezoelectric crystal is typically shaped like a disk or a rectangle of some thickness, which when energized electrically vibrates with a frequency that is determined by its thickness and other parameters. The entire surface of a crystal can be made to vibrate normal to its major surface and accordingly, a sonic wave is produced into a neighboring medium. For example, a dual segmented crystal 801 depicted in FIG. 4 vibrates at a frequency FX=500 kHz. Please note that this frequency may vary based on the crystal used, and the invention is not limited to any particular crystal frequency. The dual segmented crystal 801 includes an upper crystal layer bonded to a lower crystal layer via a center electrode 802. The center electrode 802 may include an upper electrode and a lower electrode, where an upper surface of the upper electrode is bonded to the upper crystal layer, a lower surface of the lower electrode is bonded to the lower crystal layer, and the upper surface of the lower electrode is bonded to the lower surface of the upper electrode. The center electrode 802 may also be a single electrode whose upper surface is bonded to the upper crystal layer and bottom surface is bonded to the lower crystal. The rectangles shown in each crystal layer may correspond to electrode segments that are affixed to a surface of the crystal layer. Each electrode segment affixed to a surface of a crystal layer may be in directly connected to the equivalent electrode on the crystal bonded to it, or such connection can be made via separate wiring from the transmit pulse source.

Figure 5:
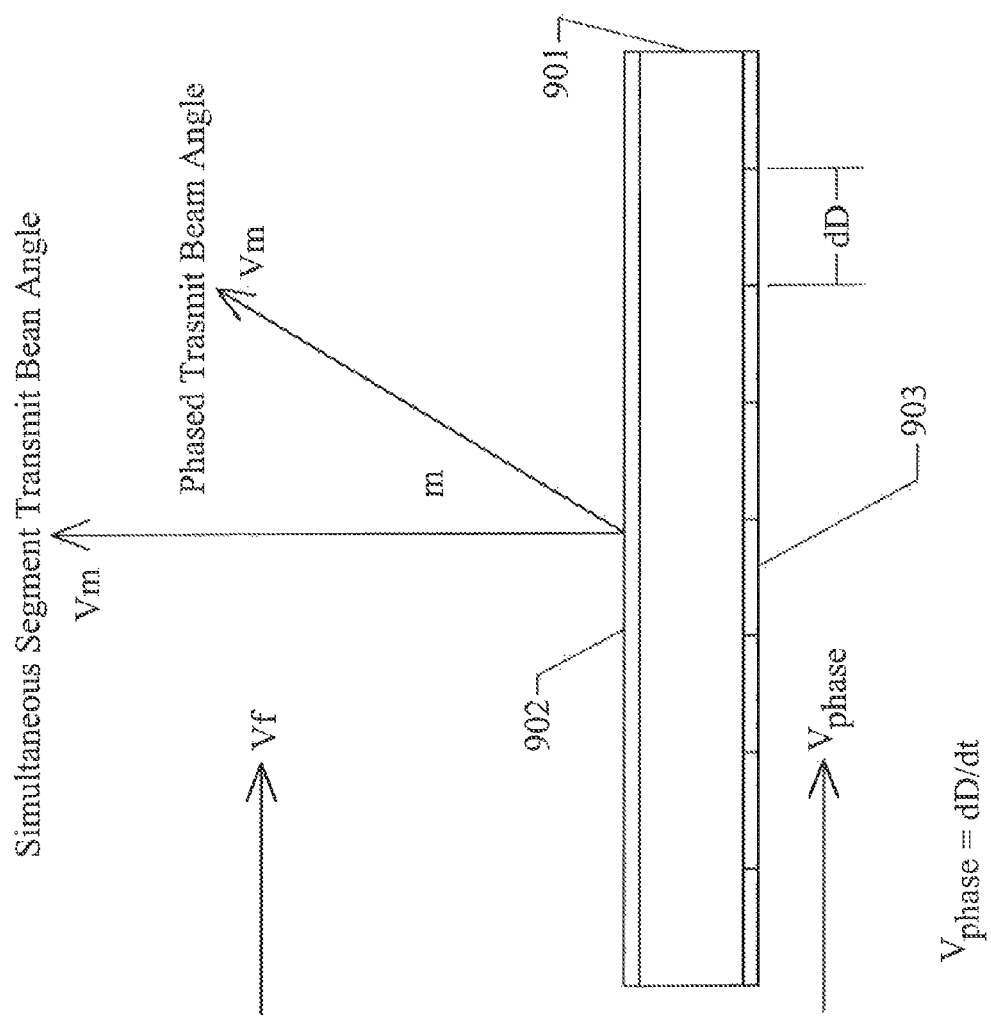
FIG. 5 illustrates a segmented piezoelectric crystal that may be used in embodiments of the transducer.

FIG. 5 illustrates an embodiment one of the crystal layers of FIG. 4, a crystal 601 of FIG. 2, or a crystal 701 of FIG. 3A and FIG. 3B. Referring to FIG. 5, the structure includes a crystal 901 whose upper surface is bonded with a common electrode 902 and whose lower surface is bonded with a plurality of electrode segments 903 that allow for phase controlled beam steering to be applied. The common electrode 902 may be one continuous electrically conductive material, while the electrode segments 903 are discontinuous separate pieces of the same or a different electrically conductive material. The segments 903 may be separated from one another by a predefined distance or may be inscribed by simply cutting the surface of a larger single electrode to form separate segments insulated from each other.

Referring to the velocity of the sonic beam within crystal 901 as Vphase, it should be noted that the angle of any energy derived from this beam that enters a medium (e.g., a fluid such as a gas or a liquid) in contact with the surface is governed by Snell's law depicted in Equation 1 as follows:

$$\frac{Vm}{Vphase} = \frac{\sin(m)}{\sin(p)} \quad [\text{Equation 1}]$$

where Vm is the sonic propagation velocity of the medium, p is the angle of the beam within the emitting surface, which is parallel to the surface, and m is the angle of the beam in the medium relative to the plane of the emitting surface. If the sine of angle p is P, and P is known, then angle p is the arc sine of value P. For example, if P=1, then angle p=90 degrees. If the angle p of the beam within the emitting surface relative to the pipe surface is assumed to be 90 degrees, since the sine of 90 degrees is 1, the equation simplifies to Equation 2 as follows:

$$Vphase = \frac{Vm}{\sin(m)} \quad [\text{Equation 2}]$$

Thus, if one wants to control the angle m of the beam in the medium to be for example 45 degrees, one needs to set the sonic phase velocity Vphase of the beam=Vm/Sin (45 degrees)=Vm/0.707=1.414×Vm. For example, if the medium is water where sound can flow at about 1493 m/s, the sonic velocity Vphase of the beam would need to be about 1.414×1493 m/s=2111 m/s to result in a 45 degree angle m. Thus, control of the phase velocity Vphase permits control of the angle m in many practical cases. Accordingly, at least one embodiment of the invention is directed to an ultrasonic flow meter, which can adjust its phase velocity Vphase dynamically.

Referring FIG. 5, if all of the electrode segments 903 were energized at the same time, it would result in the same effect as if the electrode was not segmented. However, in phase controlled beam steering, rather than energizing each segment at the same time, the segments are energized sequentially (e.g., from left to right), with the time at which each segment was energized at a slight time delay relative to the prior segment. Thus, the sonic beam emitted from the surface of the crystal would no longer be normal to the surface, but rather at an angle m.

Figure 6:
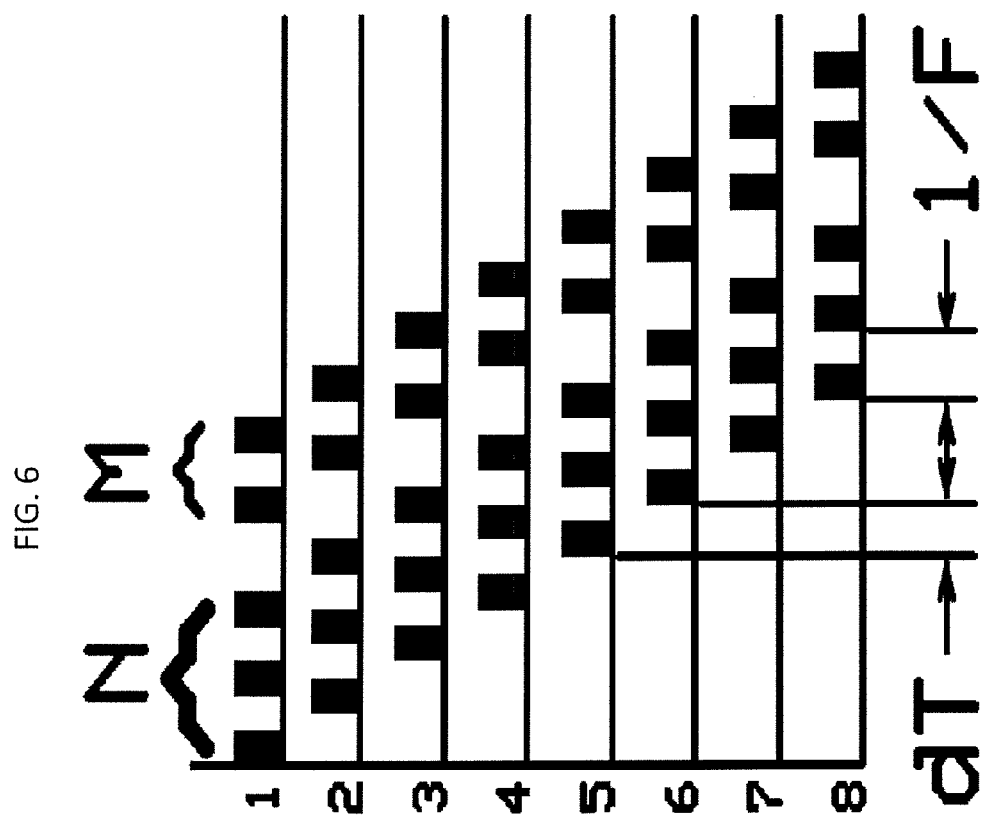
FIG. 6 illustrates a method of driving the segmented piezoelectric crystal according to an exemplary embodiment of the invention.

FIG. 6 illustrates an example of a pulse train (e.g., series of sequential pulses) that can be applied to the electrode segments 903 to achieve phase controlled beam steering. For example, the first row illustrates the pulse train or pulse signal applied to the first one of the segments 903, the second row illustrates the pulse train or pulse signal applied to the second one of the segments 903, the third row illustrates the pulse train or pulse signal applied to the second one of the segments 903, etc. While FIG. 6 illustrates 8 segments or segment electrodes, the invention is not limited to any particular number of segment electrodes. For example, a pulse signal of a first duration (e.g., 1 uS) with several pulses (N) of a shorter second duration (e.g., in the picosecond range) is applied to the first segment, then the pulse signal the same first duration is delayed by the delay time dt (e.g., number of picoseconds), then the delayed pulse signal (e.g., see row 2 in FIG. 2) is applied to the second segment, then the delayed pulse signal is delayed further by the delay time, then the further delayed pulse (see e.g., row 3) is applied to the third segment, etc. For example, the delay time dt between successive pulses of the pulse signal applied to a same segment among the segments is the period of the sonic signal emitted.

Computing the angle m involves recognizing that the time delay between arrivals of the pulse train to each segment can be interpreted as a phase velocity Vm, which is equal to the distance between segments dD divided by that time difference dt. For example Vphase=dD/dt, where dD is the distance between segments, and dt is the delay time between application of the pulse train to adjacent segments. The pulse train may be sequential and periodic application of a signal to each segment that cause corresponding portions of the crystal to be become energized and emit sonic pulses.

The generation of the sonic wave along the surface of the crystal may be identical to the case of the phase velocity Vm of the sonic wave produced by an un-segmented clamp-on transducer as it arrives on a pipe wall.

Varying the time delay dt, controls the angle m made with the emitting surface. Thus, an ultrasonic transducer with a segmented crystal driven as described above enables the sonic beam to be directed in the medium to any specific target, such as where the receive transducer is located.

Since the angle m in the clamp-on transducer case is also dependent on the sonic propagation velocity of the medium Vm, which could vary, the angle might change so as to miss the receive transducer. This can be automatically corrected as noted above by adjusting the delay time dt to optimize the beam angle to satisfy the control criteria. For example, if 3 segments were present, where segment 1 is activated at time 0, segment 2 is activated at time 10 ms, and segment 3 is activated at time 20 ms (e.g., dt=10 ms), and it was determined that the resulting sonic beam is missing the receive transducer, dt could be set on the fly by an apparatus generating the pulse train to a smaller or larger value that would result in the sonic beam hitting the receive transducer.

Varying dt acts to "steer" the beam, and in conjunction with a feedback system, dt can be automatically controlled so as to maintain any reasonable predetermined beam angle. Since the angle of the beam changes when the medium changes, or when the velocity of the medium changes, the feedback system can be operated periodically to recalibrate dt to ensure that the beam always hits the receive transducer. This technique may also be applied to the wetted transducer shown in FIG. 2. In this case, dt is again selected to direct the beam optimally to the receive transducer to overcome beam blowing. In this case, a change in Vm will not change the beam angle since the wetted transducer emits the beam orthogonally.

Referring back to FIG. 6, the letter N corresponds to the number of pulses in the pulse signal for activating electrode segments 903 with respective delays in a forward order during an activation period of a given transducer. After the segments 903 have been activated, they may continue to emit sonic pulses for a period of time afterward. The segments 903 can be silenced by applying a dampening signal (e.g., Damp pulse) with a number of pulses M to the segment electrodes.

Figure 7:
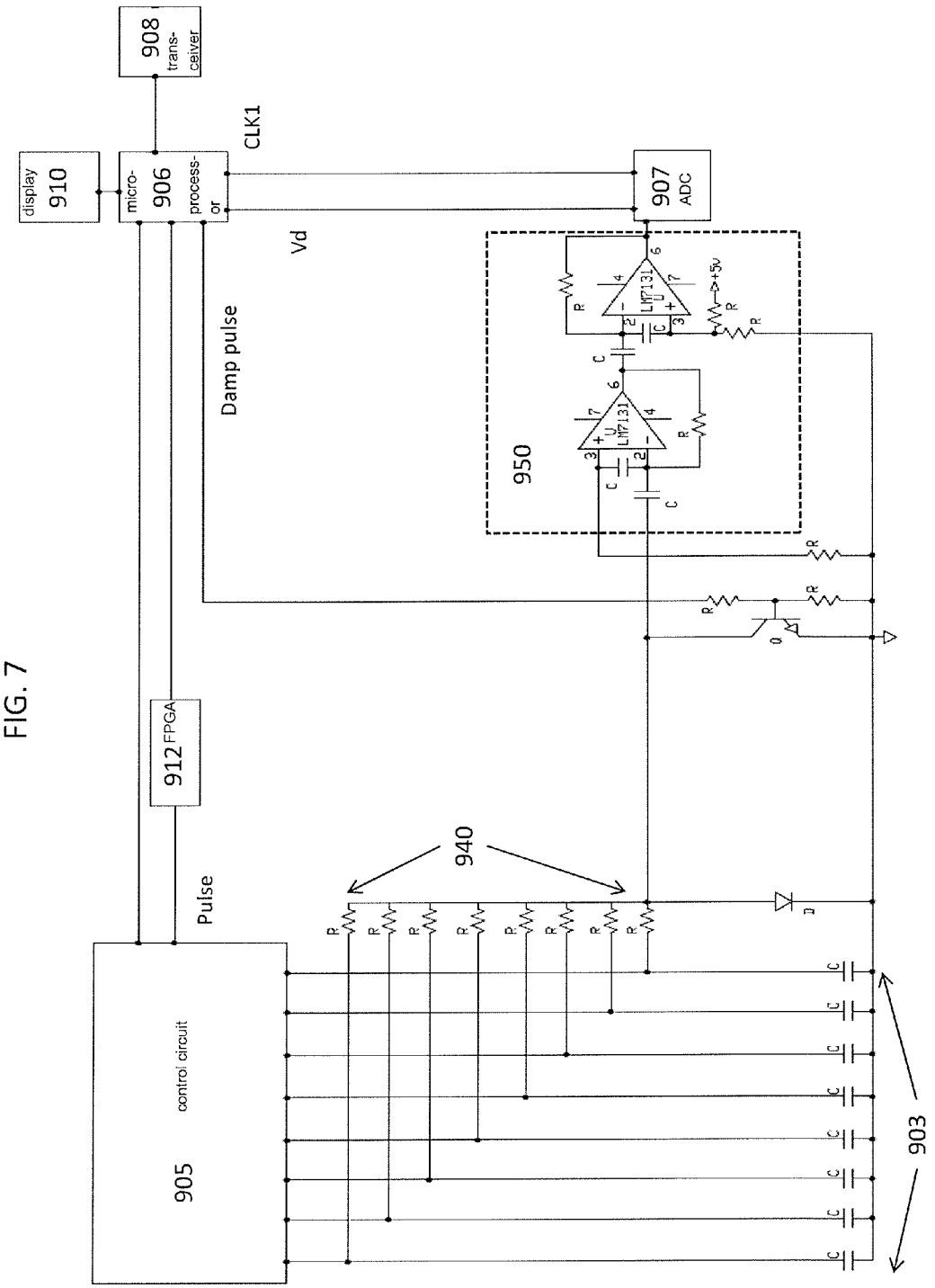
FIG. 7 illustrates a system for driving a segmented piezoelectric crystal of the transducer according to an exemplary embodiment of the invention.

FIG. 7 illustrates a system for driving the segments according to an exemplary embodiment of the invention. The system includes a microprocessor 906, a field programmable gate array FPGA 912 driving a first control circuit 905 (e.g., may include one or more switches, multiplexers, demultiplexers, etc.) with a control signal that indicates which of the segment electrodes 903 to activate based on a calculated delay time dt. The segment electrodes 903 are illustrated in FIG. 7 as a set of capacitors. The microprocessor 906 may include a pulse generator to generate a pulse signal with a number of pulses to have a certain constant transmit frequency, for application to the first control circuit 905.

The first selection circuit 905 is configured to provide the pulse signal successively to the segment electrodes 903 based on the control signal from the FPGA 912 or the microprocessor 906. For example, the microprocessor 906 can vary the control signal to sequentially activate the first segment electrode, the second segment electrode, . . . , up to the last segment electrode of the segment electrodes 903 in a forward order with a delay dt to cause the crystal 901 to emit a sonic signal of a given angle in a given medium, where the delay time dt is based on the type of the medium and the distance between the segments. The microprocessor 906 can later apply a dampening signal (damp pulse) by varying the control signal. Resistors 940 may be connected to each segment electrode, and a node connected to all the resistors 940 may be connected to an amplifier 950. When the transducer of FIG. 7 functions as a receive transducer, the voltage of the node is applied to the amplifier 950 to generate an analog voltage for output to an analog to digital converter (ADC) 907. The analog voltage may be generated from activation of the crystal 901 by a transmit ultrasonic transducer. The ADC 907 converts the analog voltage into a digital voltage Vd for output to the microprocessor 906, which can use the digital voltage Vd to calculate a flow rate within a pipe.

For convenience of illustration, FIG. 7 only shows a Transmit control circuit 905. However, a second similar control circuit may be present to function as a Receive control circuit, both part of a Single Path, so, while the first control circuit 905 transmits, the receive control circuit receives, both part of one Up minus down time difference computation. For example, inputs of the receive control circuit may be connected to the segments 903, and the microprocessor 906 or the FPGA 912 may read from the second control circuit.

The system may include a transceiver 908 that is used to wirelessly transmit the flow rate or other flow related data to a remote system (not shown).

The FPGA 912 may manage the generation of the control signal to provide a very fast and high resolution dt implementation required to follow variations in flow velocity and medium chemistry that may be encountered in industrial applications. When the FPGA 912 is present, an amplifier may be present between the FPGA 912 and the demultiplexer 905. When the FPGA 912 is not present, the microprocessor 906 handles generations of the control signal.

The transceiver 908 may make use of cellular phone technology to communicate flow meter data to a remote central processing station that permits higher level functions such as may be found in flow computer and flow transmitters on a system basis. Accordingly, the flow rate may be calculated remotely by the remote station. This may avoid the need and expense of adding such functions to each individual flow measurement point depicted in FIG. 7. In addition, such a communication network can enable remote billing and system leak detection functions by presenting simultaneous data reports describing current activity of an entire system. As an example, each report could include at least one of the following: flow rate, medium sonic propagation velocity, medium density, process non-uniformity and aeration content, process temperature, process pressure, medium viscosity, flow profile condition, flow profile condition, equipment or process fault conditions, battery condition, etc. The system of FIG. 7 may further include an optional display 910 to present the reports or to enable a user to configure the delay time dt.

Embodiments of an ultrasonic flow meter discussed above may be targeted at the distribution of natural gas, oil and water to commercial and residential users. The supply of these is provided by utilities that bill for the amounts provided based on the best metrology available. These embodiments may provide an improvement in accuracy from about 3% to 5% to better than ½% to 1%.

In a further embodiment of the ultrasonic flow meter, the meter is designed to support very high pressures so it can be certified by regulation authorities as acceptable to existing codes. Accordingly, an exemplary embodiment of a clamp-on version of the ultrasonic flow meter is used in conjunction with a Polyamide pipe. As an example, the Georg Fischer Company provides a Polyamide pipe which has been approved to American Gas Associate (AGA) standards for use in Natural Gas distribution up to a pressure of 200 psi, which includes the entire range of distribution for the intended commercial and residential distribution markets.

The polyamide, related to or known commercially as Risan® BESHV BLK TL, is a plastic that displays lower support of ultrasonic wave propagation than metal pipes. Accordingly, such a plastic, already meeting the AGA requirements, displays very low transmittal of the type of pipe noise which causes drift and error in the computation of flow rate using the Clamp-On technology described above.

Therefore, a further embodiment of the ultrasonic flow meter is described below that can be used in conjunction with a polyamide pipe, to deliver high accuracy. Using the principles of the Phase Controlled Ultrasonic Flow meter described above (e.g., use of a segmented crystal whose segments are driven sequentially with a configurable delay time dt), this basic design is applicable to the flow measurement of a wide range of products, such as Gas, Water and Oil. The very same meter, applied within its pressure, temperature and chemical compatibility limits, is differentiated between these applications merely by placement of the Clamp-On transducers in the alternative Gas, Oil and Water separation positions and clamping them into place with the means provided.

The meter may include a display (e.g., see 910 of FIG. 7) that provides an installation menu that provides the installer with the means to identify which application is being serviced, which enables application of the built-in application parameters to assure best possible performance of the meter itself. It is also possible for a well defined product, within well defined application conditions; to use a non-phase controlled Clamp-On transducer to obtain the same performance, with pre-determined transducer spacing and installation parameters.

Figure 8A:
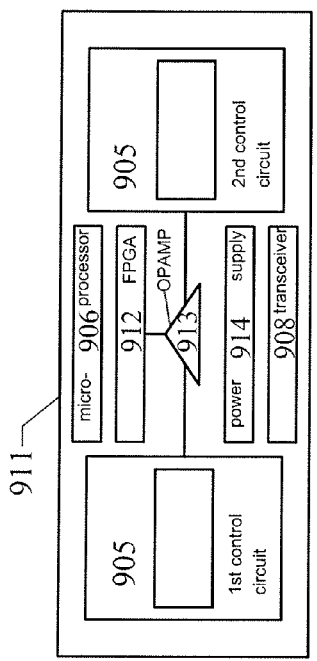
FIG. 8A and FIG. 8B illustrate a clamp-on ultrasonic flow meter according to an exemplary embodiment of the invention.
Figure 8B:
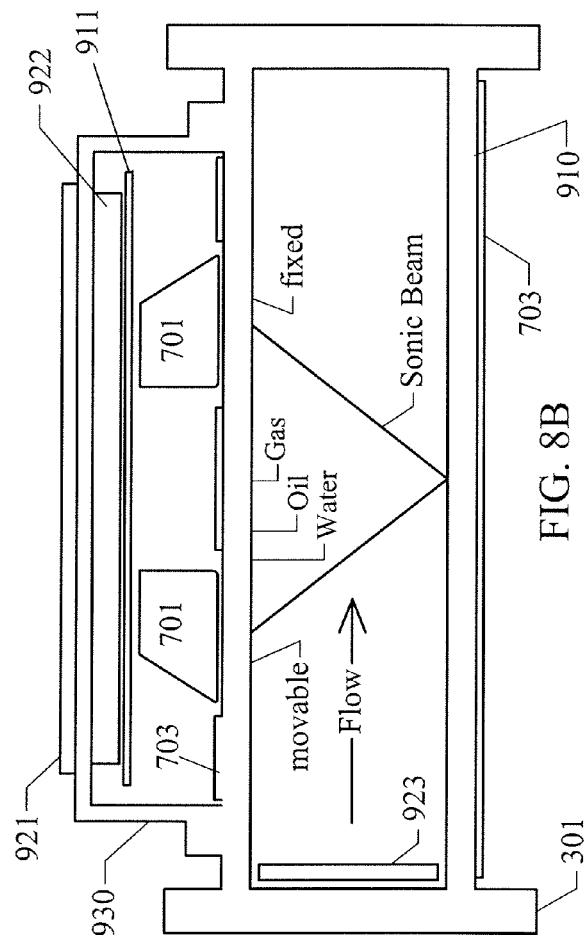

An ultrasonic flow meter according to an exemplary embodiment of the invention is shown in FIG. 8A and FIG. 8B. It illustrates a DOT approved polyamide pipe 910 on which an enclosing housing 930 is mounted by suitable means. The two Clamp-on transducers 701 are coupled to the pipe 910 sonically by either ultrasonic coupling compounds, or are sonically welded, glued or machined from the same substrate material. The figure shows the transducers installed in one of three selected mounting positions. For example, the second transducer 701 is at a fixed position, and the first transducer is positioned at first position for water, a second position for oil, or a third position for gas. While three positions are illustrated for moving the first transducer 701, it may be moved to other position based on the medium used.

The housing 930 may include similar circuitry described with respect to the system of FIG. 7. The housing 930 may include a circuit board 911 on which control circuits 905 are mounted, where the first control circuit 905 corresponds to the upstream transducer (e.g., the first 701), and the second control circuit 905 corresponds to the downstream transducer (e.g., the second 701). For example, the first control circuit 905 can be used to control activation of segment electrodes of a crystal of the first 701 and the second control circuit 905 can be used to control activation of segment electrodes of a crystal of the second 701.

Installed on the circuit board 911 are the microprocessor 906, an optional FPGA 912, the transceiver 908, and an optional amplifier 913. When the FPGA 912 is present, instead of the microprocessor 906 directly controlling the control circuits 905 to activate the segments, this can be performed by the FPGA 912. The amplifier 913 may used to amplify as necessary any signals generated by the microprocessor 906 or the FPGA 912 so that they are compatible with the voltage levels expected by the demultiplexers 905.

The circuit board 911 may also include one or more memory chips and a display (e.g., see display 910 of FIG. 7). The circuit board also includes a power supply 914. In an exemplary embodiment, separate and installed in the cover of the housing 930 are a battery 922 and a solar battery charging element (e.g., a solar panel 921), as well as the antennae needed for wireless communication of data by the transceiver 908. The power supply 914 may include the battery 922 and the solar panel 921.

The sonically absorptive material 703 applied to the exterior of the Polyamide or other Plastic pipe which forms the body of the flow meter prevents sonic reflections of ultrasound from the outside wall of the pipe from re-entering the flowing medium and causing interference. This also minimizes any signal generated by the transmit transducer from reaching the receive transducer by any path other than through the flowing medium.

When the up transducer (e.g., first 701) is to be activated to generate a sonic signal, the microprocessor 906 or the FPGA 912 is configured to output first control signal(s) to the first control circuit 905 so that the first transducer 701 outputs a sonic signal. When the down transducer (e.g., second 701) is to be activated to generate a sonic signal, the microprocessor 906 or the FPGA 912 is configured to output second other control signal(s) to the second control circuit 905 so that the second transducer 701 outputs a sonic signal.

The control signal(s) may be adjusted based on the above-described beam steering methods when the crystal of the transducers are segmented.

The up and down transducers generate a voltage in response to receipt of a sonic signal, and output these voltages to the circuit board 911. These voltages may be used for calculation of the flow rate or some other parameter based on the flow rate.

Also shown is a flow profile conditioner 923, which may be implemented by a stainless steel ribbon mesh, similar in construction to those ordinarily used for scrubbing pots. This construction provides ultimate mixing of the flow at the inlet of the flow meter resulting in normalizing the flow rate distribution across the entire inlet area. Since this flattening of the flow profile remains essentially the same throughout the entire short body of the flowmeter, the error producing flow profile distortion which is normally variable with flow rate and viscosity, is either eliminated or greatly reduced from normal. This flow profile conditioner 923 also produces only a minimum pressure drop as compared to drilled plate flow conditioners.

The flow meter may be calibrated using calibration means including a means of determining the amplitude, phase or the Energy Signature of the receive signals within a defined window of time, relative to a fixed reference, such as a clock, and memorizing that phase relationship pattern. The calibration means may include means for determining a deviation of a currently received signal characteristic from the previously memorized or theoretically determined characteristic and from it determine the direction of change of the current sonic beam angle from the reference angle, so as to cause a change in the time delay, dt, of the pulses applied to the segmented transmit transducer so as to reduce and ultimately minimize any deviation in transmit angle from the reference condition.

Application of the basic design to high pressure application is implemented by replacement of the polyamide pipe by suitable metal pipe, and applying the described pipe noise trap technology, which is effective as the higher pressure of gas increases the strength of the signal, also improving the resultant signal to noise ratio.

An ultrasonic flow meter according to at least one embodiment of the invention has no friction and is not subject to wear or deterioration of performance with age.

An ultrasonic flow meter according to at least one embodiment of the invention operates bi-directionally, and covers a much wider range of flow rates than any conventional flow meter of any other type.

An ultrasonic flow meter according to at least one embodiment of the invention is much more sensitive to changes in flow rate, as it has no hysteresis.

An ultrasonic flow meter according to at least one embodiment of the invention responds to changes in flow rate much more quickly than conventional mechanical flow meters.

An ultrasonic flow meter according to at least one embodiment of the invention steers the angle of the transmitted sonic beam so that at any flow rate, it is projected at a sufficiently upstream angle so that the actual flow rate "blows" the sonic beam either downstream to arrive on the receive transducer at the same position as at any other flow rate.

In an ultrasonic flow meter according to at least one embodiment of the invention, any change of sonic transmission angle due to variation of a Medium's sonic propagation velocity causes restoration of the sonic beam angle, increased or decreased, so that the sonic beam falls on the receive transducer at the same angle as that at the time of calibration.

In an exemplary embodiment, the Up and Down transmit angles are controlled so that any deviation in computed medium sonic propagation velocity between Up and Down directions of transmit are equalized, and/or the correlation of the Up and Down receive signal waveshapes with each other or relative to a waveshape memorized at the time of calibration, are maximized.

Figure 9:
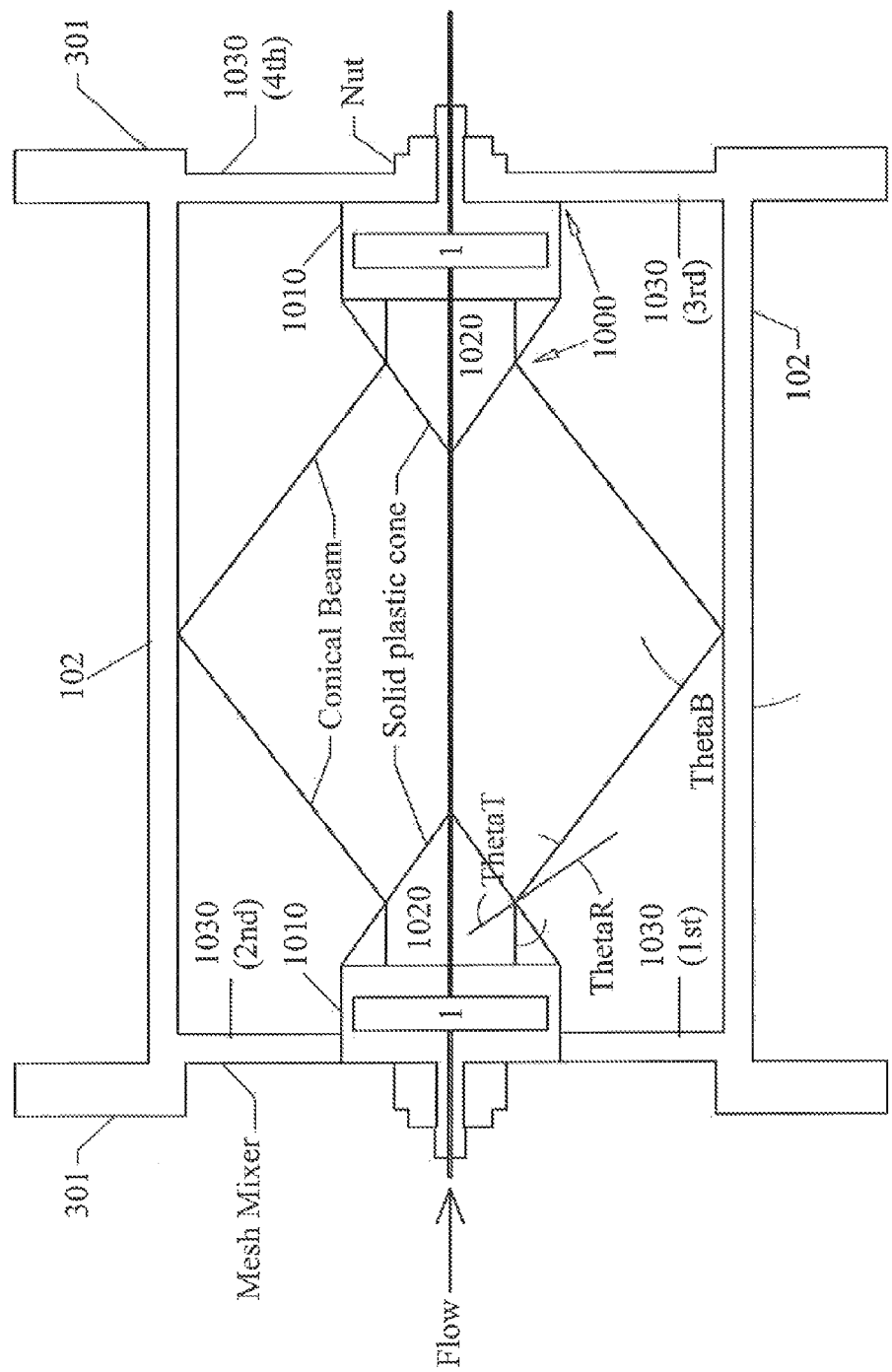
FIG. 9 illustrates a flange mounted ultrasonic flow meter according to an exemplary embodiment of the invention.

FIG. 9 illustrates an ultrasonic flow meter according to an exemplary embodiment of the invention. As shown in FIG. 9, the flow meter includes a first ultrasonic transducer 1000 (e.g., transmit/upstream) and a second ultrasonic transducer 1000 (e.g., receive/downstream). Each transducer 1000 includes a housing/assembly 1010 and a cone 1020. In an exemplary embodiment, the cones 1020 are solid plastic. Each housing/assembly 1010 houses a piezoelectric element 1 such as a piezoelectric crystal. Each housing 1010 is mounted to a respective flange 301 via rods or spokes 1030. For example, a first end of a first spoke 1030 is mounted to a lower side of a first flange 301, an opposing end of the first spoke 1030 is mounted to a first end of the first housing 1010, an opposing end of the first housing 1010 is mounted to a first end of a second spoke 1030, and an opposing end of the second spoke is mounted to an upper side of the first flange 301, For example, a first end of a third spoke 1030 is mounted to a lower side of a second flange 301, an opposing end of the third spoke 1030 is mounted to a first end of the second housing 1010, an opposing end of the second housing 1010 is mounted to a first end of a fourth spoke 1030, and an opposing end of the fourth spoke is mounted to an upper side of the second flange 301. While FIG. 9 shows each housing 1010 being mounted to a flange 301 using two spokes 1030, in an exemplary embodiment each housing 1010 or one of the housings 1010 is mounted to a flange using only one of the spokes 1030.

Figure 10:
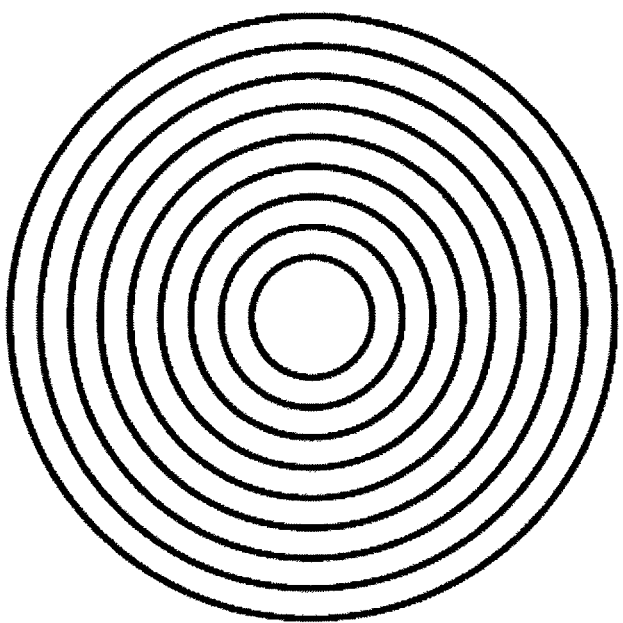
FIG. 10 illustrates a piezoelectric element that may be used in a transducer of FIG. 9 according to an exemplary embodiment of the invention.

FIG. 10 shows the piezoelectric element 1 of FIG. 9 according to an exemplary embodiment of the invention. Referring to FIG. 9 and FIG. 10, a circularly segmented ultrasonic crystal 1 is installed in a shallow cylindrical cavity in a conically shaped plastic transducer body (1020+1010), whose included peak angle approximates or is equal to 60 degrees. The sonic emission from the crystal impinges on the front surface of the cone at an angle ThetaT of 60 degrees from normal to that surface. The sonic beam emerges from that surface into the medium then present in the interior at a refraction angle ThetaR governed by the Equation 3 as follows:

$$\text{Sin}(ThetaR) = \frac{Vm \times \text{Sin}(60)}{VT} \quad [3]$$

where Vm=Sonic Propagation Velocity of the Medium and VT=Sonic Propagation Velocity of the Transducer Plastic (e.g., the plastic cone 1020). Accordingly, if the Medium were a Gas with a sonic velocity of 17000"/s and the cone were of a plastic with a sonic velocity of 85000"/s, the refraction angle of the sonic beam into the gas would be Sin(ThetaR)=(17000185000)×sin(60)=0.2×0.866=0.1732, and ThetaR=9.974 degrees. Accordingly, the emerging sonic beam into the Gas makes an angle ThetaB with the pipe wall of ThetaB=ThetaT−ThetaR=60−9.974=50.03 degrees.

Of significant interest is that this beam emerges in the shape of an inverse cone and reflects from the pipe wall 102 such that the reflected beam converges simultaneously onto the entire conically shaped Receive transducer (e.g., second 1000). This type of sonic beam has a distinct advantage in that medium flow cannot pass from Transmit to Receive transducer without having passed through the direct or reflected inverse cone, or both of them. This is unlike other ultrasonic multi-beam ultrasonic beam flowmeters, which measure flow only where their relatively small diameter cylindrical beam happens to pass, missing flow in many other regions of the pipe. Accordingly, the Conic Beam Transducer of FIG. 9 will be much less susceptible to Flow Profile error as compared to those other transducer configurations.

In addition, only one central transducer assembly is needed to provide this better full flow coverage while Multipath transducer systems, which at best still only "see" a small fraction of the actual flowing liquid, require a multiplicity of transducers adding significantly to system cost. In this case, beam steering as described above can be implemented for this Single Beam using the segmented crystal 1 shown in FIG. 10. This figure shows that the segmentation is now concentric to the center of the crystal, but in all other ways functions in the same way as previously described for rectangular crystals. Thus the net transmission angle of the inverted Solid Cone 1020 can be varied to increase or decrease it as needed to compensate for changes in either the Refraction angle or due to Beam Blowing.

Figure 11:
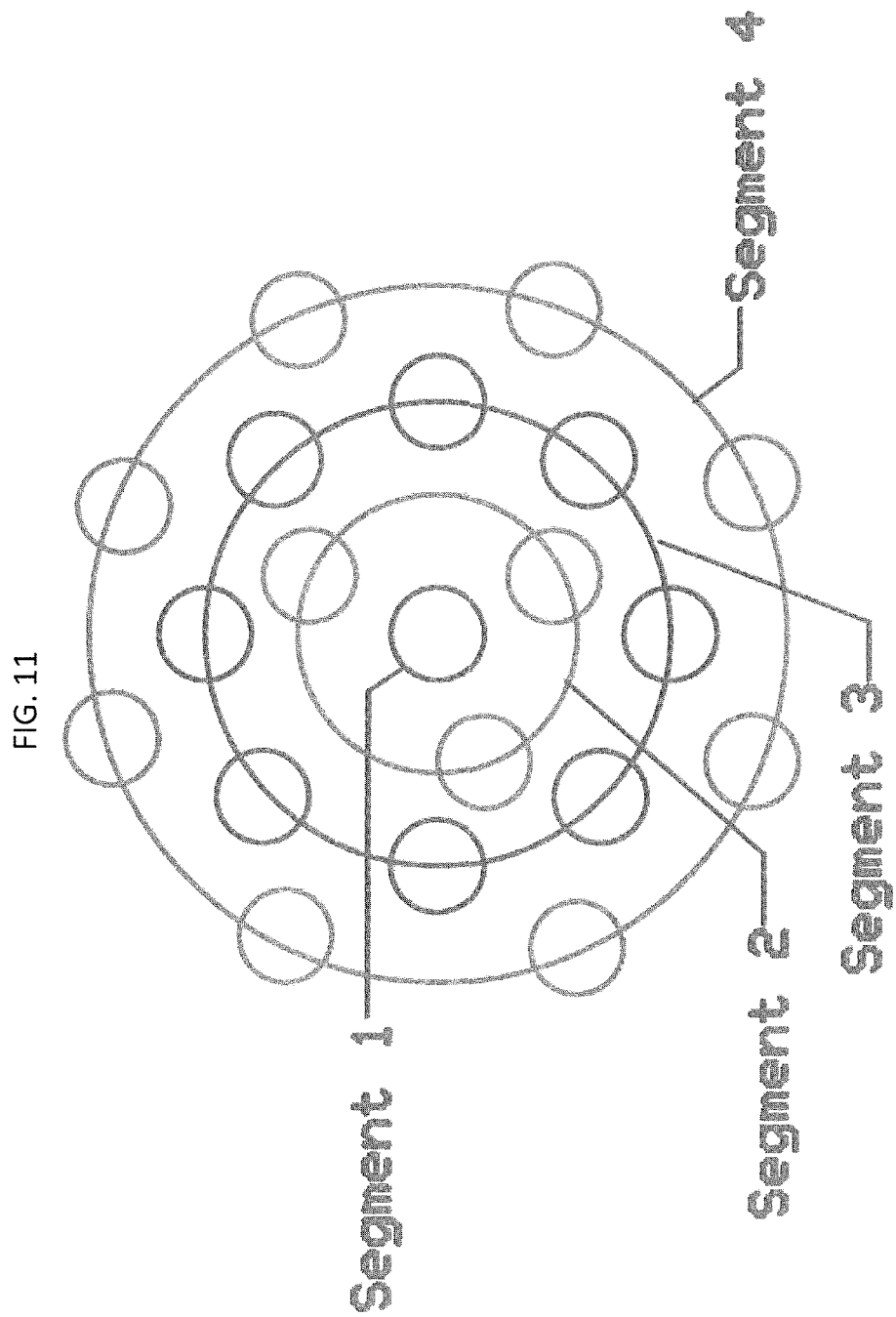
FIG. 11 illustrates a piezoelectric element that may be used in a transducer of FIG. 9 according to an exemplary embodiment of the invention.

For very large diameter pipes, where a larger Cone 1020 would be desirable, such can be made by simply using large diameter crystals. It is also possible to create such a transducer by grouping smaller crystals into large arrays, as shown in FIG. 11. For example, each circle on a respective ring-shaped segment corresponds to one of a plurality of crystals that are formed into a ring. In such a construction, Beam Steering can be accomplished not only by segmenting each crystal, but rather by energizing each cylindrical group of crystals sequentially, treating each such group as the equivalent of a Segment. In an exemplary embodiment, the crystal 1 of FIG. 9 is not segmented.

When the crystal 1 is segmented, the control circuitry described above (e.g., FIG. 7, FIG. 8A and FIG. 8B) may be used to drive the ring-shaped segments.

FIG. 12A and FIG. 12B illustrate a flange mounted ultrasonic flow meter according to an exemplary embodiment of the invention. Similar to FIG. 9, the meter includes a pair of housings 1010 (e.g., a crystal housing that houses a ring-shaped segmented piezoelectric crystal) to which a solid plastic cone 1020 is affixed. Additionally, a cone shaped flow diverter 1200 is affixed to each assembly 1010. The apex of the diverter 1200 may face away from the apex of the adjacent solid plastic cone 101 at an angle of 180 degrees. The adjacent flow diverter 1200 and cone 1020 may be have the same dimensions and be in alignment with one another without an offset. Each housing 1010 may be suspended within the pipe by angulated supports 1230. While FIG. 12A and FIG. 12B show use of 3 angulated supports 1230, a lesser or greater number of supports 1230 may be present. Further, a flow profile conditioner may be present, for example in an open area between a flange 301 and the supports 1230. There is also a connector 1210 present on each flange 301 for each assembly 1010, where crystal(s) or segments of the crystals within the corresponding assembly are energized by wires coming through the corresponding connector 120. The crystal(s)/segment(s) within a housing 1010 of FIG. 12A and FIG. 12B may be energized using the methods described above. For example, the circuit of FIG. 7 or the board 911 may be used to crystals(s)/segments(s) within a housing 1010 shown in FIG. 102.

The cone shaped transducer (e.g., crystal assembly 1010+ cone 1020) refracts the sonic energy provided by the crystal into the medium, which can be a liquid or a gas. The angulated supports (e.g., rods) 1230 permit the flanges 301 to be close together, as is desired for installing the meter in tight spots, and also reduces a pressure drop that could be caused if they were not angulated. For example, an angulated support 1230 is at an angle less than 90 degrees relative to a wall of a flange 301. The flow interference that they cause may be beneficial as it acts to flatten the flow profile, which could even enhanced by the flow profile conditioner (e.g., a mesh). The flow diverters 1200 are optionally present to potentially reduce a pressure drop or to divert the flow more easily, while also causing the mixing of the flow, which helps to flatten the flow profile.

As seen in FIG. 12A and FIG. 12B, the entire area of the pipe is flooded with radially directed sonic beams, so that no molecule can enter the meter, and leave it, without passing through the ultrasonic beams. Previous flow meters depend on measurement beams, which are narrow, and leave most of the area of the pipe unmeasured.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the disclosure.

What is claimed is:

1. An ultrasonic transducer system comprising:
   a first ultrasonic transducer comprising a plurality of first segment electrodes located on a surface of a single first piezoelectric element;
   a second ultrasonic transducer comprising a plurality of second segment electrodes located on a surface of a single second piezoelectric element;
   a pulse generator configured to generate a pulse signal that comprises pulses of a transmit frequency; and
   a control circuit that sequentially activates the first segment electrodes using the pulse signal to cause the first piezoelectric element to emit a first sonic signal, where a delay time of a first value between activation of each successive first segment electrode controls a phase velocity of the first sonic signal, and the angle of emission of the first sonic signal,
   wherein the control circuit is configured to change a value of the delay time to a second value different from the first value when the angle of emission is determined to be out of alignment with a reference angle,
   wherein the angle of emission is determined to be out of alignment with the reference angle, when a characteristic of a second sonic signal transmitted by the second ultrasonic transducer in response to the emitted first sonic signal deviates from a reference characteristic.

2. The ultrasonic transducer system of claim 1, wherein the first segment electrodes are bonded to the surface of the single first piezoelectric element and the second segment electrodes are bonded to the surface of the single second piezoelectric element.

3. The ultrasonic transducer system of claim 1, further comprising a clamp that enables the ultrasonic transducer system to be clamped around a spool of pipe.

4. The ultrasonic transducer system of claim 3, wherein the clamp comprises a sonically absorptive plastic.

5. The ultrasonic transducer system of claim 1, further comprising a sonically conductive and dissipative plastic surrounding the piezoelectric element.

6. The ultrasonic transducer system of claim 1, wherein the control circuit further comprises a transceiver configured to wirelessly transmit data based on the second sonic signal sensed by the first transducer.

7. The ultrasonic transducer of claim 1, wherein one of the piezoelectric elements is sealed within a metal tube.

8. The ultrasonic transducer system of claim 7, wherein the tube includes a hollow wiring cavity that enables wires to be connected to the segment electrodes of the one piezoelectric element.

9. The ultrasonic transducer system of claim 7, wherein a front face of the metal tube has a ¼ wavelength plastic coating.

10. The ultrasonic transducer system of claim 1, where the first segment electrodes are each spaced apart from one another a same distance and the second segment electrodes are spaced apart from one another a same distance.

11. The ultrasonic transducer system of claim 10, wherein the phase velocity is the delay time divided by the distance.

12. The ultrasonic transducer system of claim 1, wherein the control circuit is configured to continually adjust the delay time when it determines the angle of emission is out of alignment with the reference angle until the adjustments result in the angle of emission being in alignment with the reference angle.

13. The ultrasonic transducer system of claim 1, wherein the reference characteristic is based on a third sonic signal received by the first ultrasonic transducer from the second ultrasonic transducer prior to emission of the first sonic signal.

14. The ultrasonic transducer system of claim 13, wherein the reference characteristic is an amplitude, a phase, or an energy signature of the third signal relative to a fixed reference.

15. An ultrasonic transducer system comprising:
   a first ultrasonic transducer comprising a plurality of first segment electrodes located on a surface of a single first piezoelectric element;
   a second ultrasonic transducer comprising a plurality of second segment electrodes located on a surface of a single second piezoelectric element;
   a pulse generator configured to generate a pulse signal that comprises pulses of a transmit frequency; and
   a control circuit that sequentially activates the first segment electrodes using the pulse signal to cause the piezoelectric element to emit a first sonic signal, where a delay time of a first value between activation of each successive first segment electrode controls phase velocity of the sonic signal, and the angle of emission of the first sonic signal,
   wherein the control circuit changes the transmit frequency of the pulse generator to a different frequency when it determines that the angle of emission is out of alignment with a reference angle,
   wherein the angle of emission is determined to be out of alignment with the reference angle, when a characteristic of a second sonic signal transmitted by the second ultrasonic transducer in response to the emitted first sonic signal deviates from a reference characteristic.

16. The ultrasonic transducer system of claim 15, wherein the first segment electrodes are bonded to the surface of the single first piezoelectric element and the second segment electrodes are bonded to the surface of the single second piezoelectric element.

17. The ultrasonic transducer system of claim 15, wherein the reference characteristic is based on a third sonic signal received by the first ultrasonic transducer from the second ultrasonic transducer prior to emission of the first sonic signal.

18. The ultrasonic transducer system of claim 17, wherein the reference characteristic is an amplitude, a phase, or an energy signature of the third signal relative to a fixed reference.

19. An ultrasonic transducer comprising:
  a plurality of segment electrodes located on a surface of a single piezoelectric element;
  a pulse generator configured to generate a pulse signal that comprises pulses of a transmit frequency; and
  a control circuit that sequentially activates the segment electrodes using the pulse signal to cause the piezoelectric element to emit a sonic signal, where a delay time between activation of each successive segment electrode controls phase velocity of the sonic signal, and the angle of emission of the sonic signal,
  wherein after the control circuit sequentially activates the segment electrodes using the pulse signal, the control circuit applies a dampening pulse signal to the segment electrodes to dampen the emitted sonic signal.

20. The ultrasonic transducer of claim 19, wherein the segment electrodes are bonded to the surface of the single piezoelectric element.

* * * * *